United States Patent [19]

Miller

[11] 3,844,917

[45] Oct. 29, 1974

[54] PROCESS FOR THE PREPARATION OF RING-CHLORINATED ALKYLBENZENES

[76] Inventor: Bernard Miller, Amherst, Mass.

[22] Filed: Dec. 20, 1971

[21] Appl. No.: 210,231

[52] U.S. Cl... 204/163 R, 204/158 HA, 260/649 R, 260/650 R
[51] Int. Cl............................ B01j 1/10, C07c 17/12
[58] Field of Search............ 260/650 R, 649 R, 668; 204/158 HA, 163 R

[56] References Cited
UNITED STATES PATENTS

| | | | |
|---|---|---|---|
| 2,977,395 | 3/1961 | Schaeffer et al. | 260/668 R |
| 3,640,821 | 2/1972 | Sweeny et al. | 260/649 DD |

FOREIGN PATENTS OR APPLICATIONS

| | | | |
|---|---|---|---|
| 234,290 | 3/1909 | Germany | 260/650 R |
| 294,638 | 7/1914 | Germany | 260/650 R |
| 971,053 | 9/1964 | Great Britain | 260/650 R |

OTHER PUBLICATIONS
Forrest et al. J. Chem. Soc. (1946) 333–339

*Primary Examiner*—Leland A. Sebastian

[57] ABSTRACT

A method for the preparation of ring-chlorinated alkylbenzenes which involves converting an alkylated arylsulfonyl chloride or alkylated diarylsulfone, in which the sulfonyl group occupies the position on the ring in which it is desired to place a chlorine atom, to a ring-chlorinated alkylbenzene by replacing the sulfonyl group with a chlorine atom by a process involving chlorination in the presence of light of between 300 and 500 $\mu$ or free radical chlorination and subsequent replacement of benzylic halogen by hydrogen. The ring chlorinated alkylbenzenes are useful as chemical intermediates for the preparation of monomers and plasticizers.

3 Claims, No Drawings

PROCESS FOR THE PREPARATION OF RING-CHLORINATED ALKYLBENZENES

The present invention relates to a novel method of preparing alkylbenzenes bearing chlorine atoms at specific positions on the ring.

A process for the preparation of alkylbenzenes bearing chlorine atoms at specific positions on the ring would be of value, since such molecules are useful intermediates for the preparation of dyes, monomers, and plasticizers. Ring-chlorinated alkylbenzenes can be prepared by direct chlorination of alkylbenzenes in the presence of acidic catalysts. Such chlorination, however, gives mixtures of isomers which have very similar physical properties, and are normally difficult to separate. This invention provides a method for the preparation in high yield of alkylbenzenes bearing chlorine atoms at specific positions.

In this invention a starting material selected from the group consisting of arylsulfonyl chlorides and diarylsulfones bearing alkyl groups on the aromatic ring is reacted with a free radical chlorinating agent selected from the group consisting of chlorine in the presence of light of between 300 and 500 m$\mu$, chlorine at temperatures above 80°, sulfuryl chloride in the presence of free radical initiators, and sulfuryl chloride at temperatures above 80°. This process replaces the sulfonyl group by a chlorine atom, while partially chlorinating the benzylic positions of the alkyl groups. The benzylic chlorine atoms are then replaced by hydrogen atoms by reaction with reducing agents consisting of a metal, selected from a group consisting of aluminum, iron, magnesium, sodium, and zinc, in the presence of a solvent containing active hydrogen atoms, said solvent being selected from a group consisting of water, acetic acid, aqueous hydrochloric acid, aqueous sulfuric acid, aqueous phosphoric acid, alcohols containing one to four carbons, and mixtures of these solvents.

The group of sulfonyl chlorides and sulfones which may be employed in this process includes, but is not limited to, p-toluenesulfonyl chloride, 4-chlorosulfonyl-1,2-dimethylbenzene, 4-chlorosulfonyl-1,3-dimethylbenzene, 2-chlorosulfonyltetralin, 2-chlorosulfonylhydrindane, 4-chlorosulfonyl-1,2-diethylbenzene, bis-(3,4-dimethylphenyl)sulfone, and bis-(2-tetralinyl)sulfone.

This process is illustrated in the equations below, which are not intended to limit this invention.

more selective process than chlorination, presumably due to the size of the sulfonating agent. Thus, chlorination of o-xylene leads to a mixture of 3-chloro-1,2-dimethylbenzene and 4-chloro-1,2-dimethylbenzene, while chloro-sulfonation leads to a product consisting largely of 4-chlorosulfonyl-1,2-dimethylbenzene. A further advantage is that the sulfonyl halides are usually solids (as are, for instance, 4-chlorosulfonyl-1,2-dimethylbenzene and bis-(3,4-dimethylphenyl) sulfone) and may be recrystallized to remove small amounts of undesired isomers. The use of sulfones is advantageous because they can be economically prepared by reaction of aromatic hydrocarbons with sulfur trioxide or fuming sulfuric acid, or by oxidation of diaryl sulfides.

The invention will be better understood by referring to the illustrative examples set forth below. These are not to be taken as limiting the invention.

EXAMPLE 1

Preparation of 4-Chloro-1,2-dimethylbenzene from 4-Chlorosulfonyl-1,2-dimethylbenzene Crude 4-chlorosulfonyl-1,2-dimethylbenzene, (20.0 g.) prepared by reaction of ortho-xylene with chlorosulfonic acid without further purification, was dissolved in 200 ml. of chloroform. The solution was illuminated by a 150 watt incandescent bulb and stirred mechanically while chlorine gas was bubbled through it. At intervals, small samples were removed for analysis by vapor phase chromatography. When analysis indicated that less than 10 percent of the sulfonyl chloride remained unchanged, the flow of chlorine was stopped and the solution was shaken with aqueous sodium bisulfite solution, washed with water, dried over magnesium sulfate, filtered, and the solvent evaporated to give 16.2 g. of yellow oil. 8.0 g. of this yellow oil were dissolved in 25 ml. of ethyl alcohol and the solution poured into rapidly stirred concentrated hydrochloric acid (ca. 100 ml.). Zinc dust (3.0 g.) was added slowly to the mixture, resulting in vigorous ebullition and the production of appreciable heat. After the mixture was stirred for 1 hour, it was extracted with methylene chloride. The methylene chloride solution was washed with water, dried over magnesium sulfate, and evaporated to give 4.0 g. of yellow oil, which was shown by nmr spectroscopy and vpc analysis to consist principally (80–90 percent) of 4-chloro-1,2-dimethylbenzene.

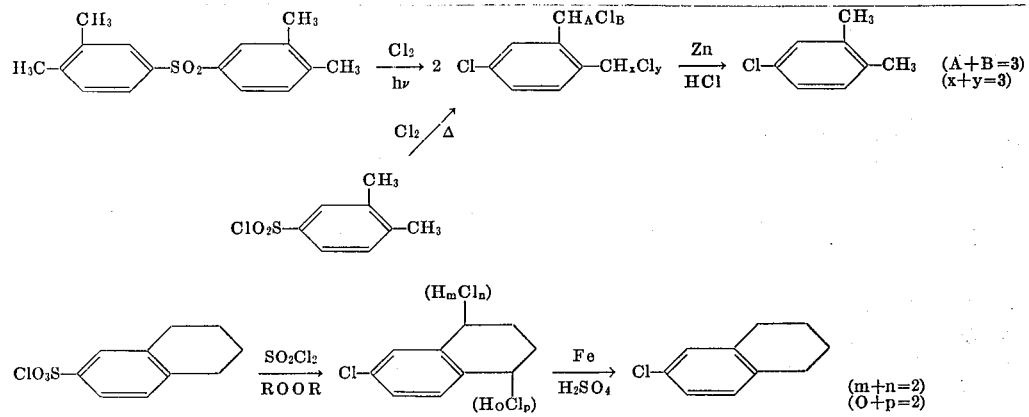

The advantage of employing sulfones or sulfonyl chlorides as intermediates in the preparation of ring-chlorinated alkylbenzenes is that sulfonation is a much

EXAMPLE 2

Preparation of 4-Chloro-1,2-dimethylbenzene from Bis-(3,4-dimethylphenyl)sulfone 4-Chlorosulfonyl-1,2-dimethylbenzene (40.1 g.) was stirred at room temperature and anhydrous aluminum chloride added slowly. When the mixture became too viscous to stir, water was added cautiously, and the resulting mixture extracted with chloroform. The chloroform layer was washed with water and sodium bicarbonate solution, dried, and evaporated to give 29.5 g. of pale yellow solid. Recrystallization from ethyl alcohol gave 24.0 g. of white needles, m.p.169°–171°, identified by its nmr spectrum as bis-(3,4-dimethylphenyl)-sulfone.

Bis(3,4-dimethylphenyl) sulfone (15.0 g.) was dissolved in 150 ml. of chloroform. The solution was stirred mechanically and illuminated with a 150 watt incandescent lamp. Chlorine gas was bubbled into the mixture until nmr analysis indicated that peaks at fields lower than δ 7.5 had essentially disappeared. The flow of gas was stopped and the reaction worked up as described in example 1 to give 19.0 g. of dark colored, lachrymatory oil. 6.0 g. of this oil were dissolved in 20 ml. of glacial acetic acid and poured into ca. 100 ml. of rapidly stirred, concentrated aqueous hydrochloric acid. Zinc dust (3.0 g.) was added slowly, resulting in vigorous ebullition and evolution of heat. After the mixture was stirred for 1.5 hours, it was worked up as described in example 1 to give 3.1 g. of 4-chloro-1,2-dimethylbenzene as a yellow fluid.

EXAMPLE 3

Reaction of Bis-(3,4-dimethylphenyl)sulfone with Sulfuryl Chloride

Bis-(3,4-dimethylphenyl)sulfone (3.0 g.) and 7.0 g. of sulfuryl chloride were dissolved in 30 ml. of chloroform. Benzoyl peroxide (0.2 g.) was added, and the mixture heated to refluxing for 5 hours. It was washed with aqueous sodium bisulfite solution then with water, dried over magnesium sulfate, and the solvent evaporated to give 4.0 g. of reddish oil, whose infrared spectrum was identical with the product of photochlorination of bis-(3,4-dimethylphenyl)sulfone.

EXAMPLE 4

Preparation of 4-Chlorotoluene p-Toluenesulfonyl chloride (15.0 g.) was dissolved in 100 ml. of chloroform, and the solution stirred mechanically and irradiated by a 150 watt incandescent bulb. Chlorine gas was passed through the solution until vpc analysis showed that the p-toluenesulfonyl chloride was essentially completely reacted. The chlorine flow was stopped and the reaction worked up as described in example 1, to give 14.0 g. of dark brown oil. The oil was suspended in 100 ml. of rapidly stirred hydrochloric acid, and iron (7 g.) added slowly. After stirring for 2 hours the reaction mixture was extracted with methylene chloride and the extract washed with water and dilute sodium bicarbonate solution. It was dried, and the solvent evaporated to give 6.1 g. of brown fluid, whose infrared spectrum was identical with that of 4-chlorotoluene.

What is claimed is:

1. A method for preparing ring-chlorinated alkylbenzenes by reacting a compound selected from the group consisting of benzenesulfonyl chlorides bearing alkyl groups of one to six carbons on the ring and benzenesulfonyl chlorides bearing cycloalkyl groups of one to six carbons on the ring with chlorine in the presence of light of between 300 and 500 mµ, and then with a reducing agent consisting of a metal and a solvent containing active hydrogen atoms to remove any nonaromatic halogens introduced in the chlorination step.

2. A method according to claim 1 wherein said benzenesulfonyl chloride is 4-chlorosulfonyl-1,2-dimethylbenzene.

3. A method for preparing 4-chloro-1,2-dimethylbenzene by reacting 4-chlorosulfonyl-1,2-dimethylbenzene with chlorine in the presence of light of between 300 and 500 mµ, and then with a reducing agent consisting of a metal and a solvent containing active hydrogen atoms to remove any non-aromatic halogens introduced in the chlorination step.

* * * * *